United States Patent [19]
Sano et al.

[11] Patent Number: 5,732,934
[45] Date of Patent: Mar. 31, 1998

[54] APPARATUS FOR INSERTING A COMMUNICATION WIRE THROUGH A PIPELINE BY AIR FLOW

[75] Inventors: Hiroaki Sano; Kinji Taguchi; Akiyoshi Noguchi; Shigeru Tanaka, all of Kanagawa, Japan

[73] Assignee: Sumitomo Electric Industries, Ltd., Osaka, Japan

[21] Appl. No.: 434,290

[22] Filed: May 3, 1995

Related U.S. Application Data

[62] Division of Ser. No. 225,321, Apr. 8, 1994, Pat. No. 5,499,797.

[30] Foreign Application Priority Data

| Apr. 10, 1993 | [JP] | Japan | 5-107412 |
| Dec. 15, 1993 | [JP] | Japan | 5-343568 |

[51] Int. Cl.$^6$ ................................................ B65H 59/00
[52] U.S. Cl. ................................................ 254/134.4
[58] Field of Search ............ 254/134, 3 FT, 254/139, 3 R, 134.4; 405/171; 175/65; 406/47, 49, 193, 117; 184/15 R; 198/493, 500; 15/104.31, 104.33

[56] References Cited

U.S. PATENT DOCUMENTS

| 4,232,981 | 11/1980 | Lee. |
| 4,412,673 | 11/1983 | Ramsden et al. ........... 254/134.3 FT |
| 4,952,021 | 8/1990 | Aoki et al. . |

FOREIGN PATENT DOCUMENTS

| 010590 | 5/1984 | European Pat. Off. . |
| 0373479 | 6/1990 | European Pat. Off. . |
| 2655783 | 12/1989 | France . |
| 8422532 | 7/1984 | Germany . |
| 250111 | 2/1990 | Japan . |
| 222921 | 5/1990 | Japan . |

*Primary Examiner*—Robert C. Watson
*Attorney, Agent, or Firm*—Cushman Darby & Cushman IP Group of Pillsbury Madison & Sutro LLP

[57] ABSTRACT

A method and an apparatus are provided for inserting and removing a communication wire in and out of a pipeline by air flow, in which static electricity can be prevented from being generated, and a long communication wire can be inserted and removed. The communication wire is fed from a reel, and inserted into a pipeline through a blowing head. Compressed air is also sent from a compressor to the pipeline through the blowing head. A drop cylinder is attached to a T-branch on the way of the pipeline, conductive material stored therein is supplied into the pipeline at a controlled rate. A recovery bottle is attached to the outlet side of the pipeline so that the air flow blowing out of the outlet side is passed through a filter 11, and at the same time the conductive material is recovered. By making the conductive material pass through the pipeline together with the air flow, generated static electricity can be eliminated, and the communication wire can be prevented from contacting tightly with the pipeline because of the static electricity.

8 Claims, 2 Drawing Sheets

APPARATUS FOR INSERTING A COMMUNICATION WIRE THROUGH A PIPELINE BY AIR FLOW

This is a division of application Ser. No. 08/225,321, filed Apr. 8, 1994, now U.S. Pat. No. 5,499,797.

BACKGROUND OF THE INVENTION

1. Field of the Invention

The present invention relates to a method and apparatus for inserting a communication wire through a pipeline, in which the communication wire, such as an optical fiber cable or the like, coated with an insulating material is inserted through the pipeline by air flow, and particularly relates to the method in which the resistance of propelling the communication wire is reduced.

2. Description of the Related Art

In a method of inserting a communication wire material through a laid pipeline by air flow while blowing compressed air therein, it is important to reduce the friction coefficient between the communication wire and the inner wall of a pipeline. For example, in an optical fiber cable disclosed in Japanese Patent Unexamined Publication No. Hei-2-50111, the friction coefficient is reduced by adding a solid lubricant to an outermost layer of a coating layer which is a contacting surface with the inner wall of a pipeline. In addition, a method of laying an optical fiber cable in which blowing powder talc as lubricant is disclosed in Japanese Patent Examined Publication No. Hei-2-22921.

In general, a pipeline through which a communication wire is inserted is made of insulating resin. The coating layer of the communication wire is made of an insulating resin. With respect to an optical fiber cable, for example, the cable is usually coated with foamed polyethylene and it is pressed and inserted into a polyethylene pipeline. As for the gas for propelling the cable, dried air or nitrogen is usually used in order to avoid increasing the frictional resistance due to moisture.

There is therefore a tendency to cause static electricity by friction when a communication wire is pressed and inserted into a pipeline by air flow. If static electricity is generated, resistance is produced by the electrostatic force so that frictional resistance increases. In the above-mentioned methods, there is indeed an effort to reduce the friction coefficient, but there is no effort to reduce static electricity. Although a method of coating the surface of a coating layer of a communication wire with an antistatic material such as diethanolamine or the like has been reported, experiments made by the present inventor and others have proven that the antistatic material is shaved from the communication wire by friction against the pipeline. The antistatic effect is reduced if the insertion distance is increased, that is, the greater the insertion distance, the lesser the antistatic effect of the antistatic material.

The following reasons are thought to account for the above-given results.

1. Since such an antistatic material has the function of discharging charged static electricity by absorbing moisture to form a semiconductor film on the material surface, the conductivity thereof comes to be lost if the insertion distance is increased so that the time of sending dried air is prolonged.

2. The antistatic material layer is shaved from the communication wire so that the effect of preventing charging is reduced.

3. If the insertion distance of the wire is increased, the frequency of friction between the pipeline and the communication wire is increased, and the possibility of generating static electricity is increased.

Thus, in a method of inserting a communication wire through the pipeline by air flow, the attraction between a pipeline and the communication wire is increased by the charging of static electricity at the time of propelling by the velocity of the propelling and the frictional resistance is increased by increasing the insertion length of the communication wire.

SUMMARY OF THE INVENTION

The present invention, taking the foregoing problems into consideration, has an object to provide a method of inserting a communication wire into or through a pipeline by air flow, in which the friction coefficient between the communication wire and the pipeline can be reduced so that a long communication wire can be inserted and recovered.

Further, the present invention has an object to provide an apparatus for inserting a communication wire through a pipeline by air flow, in which the friction coefficient between the communication wire and the pipeline can be reduced so that a long communication wire can be inserted and recovered.

According to the present invention, a method for inserting a communication wire into or through a pipeline, in which the communication wire is passed and inserted through and into the pipeline by air flow, is characterized by sending conductive minute solids into the air flow.

According to the present invention, a method for inserting a communication wire through a pipeline, in which the communication wire is inserted into and through a pipeline by air flow, is characterized by sending substantially Spherical small size particles having a particle size of 50 to 300 μm into the air flow.

According to the present invention, conductive minute solids, such as, scale-like thin films each made of conductive material and having a smooth surface, small size particles each made of conductive material, or the like, are inserted into a pipeline together with a communication wire and compressed air, and passed through the pipeline with the air flow. The communication wire contacts the pipeline and generates contact resistance so that the rate of movement is decreased. On the other hand, the conductive minute solids are away from the wall of the pipeline or the communication wire so that they move at a rate almost equal to the rate of the air flow.

Thus, the conductive minute solids such as thin films, particles, or the like, pass through between the wall of the pipeline and the communication wire and outstrip the communication wire so that they are discharged from the outlet of the pipeline. On the way, the conductive minute solids also contact charged portions of the pipeline and the communication wire. When the conductive minute solids contact portions charged positively and negatively, the conductive minute solids short-circuit the positive and negative charges to thereby reduce the charges. When contact is made with either portion, the conductive minute solids rob that portion of its charge. Unlike insulating substances, the conductive minute solids are not charged locally, but the charges are distributed over all of the solids by their conductivity so that the solids are charged in a state of low voltage. The charged conductive minute solids are moved by air flow, and discharge the charges they carry when they arrive at a portion having an opposite potential.

Even if the charged conductive minute solids cannot discharge until they arrive at the outlet of the pipeline, the conductive minute solids collect a number of charges and the charges are distributed over all of the solids such as thin films, small size particles, or the like, by their conductivity, so that the solids are charged at a very low voltage to thereby make it possible to eliminate the charges in the insertion system.

If scale-like thin films such as graphite films of, for example, 0.5 mm square and 0.05 mm thick, are used as the conductive minute solids, the potential gradient of their edge portions is made so large that the effect to discharge and eliminate static electricity is made large effectively like the principle of a lightning rod. In addition, the superficial content per weight is so large that there is an effect that many charges can be eliminated by the material of less weight.

If small size particles each made of conductive material are used as the conductive minute solids, even when the small size particles are held between the communication wire material and the pipeline, it is possible to eliminate static electricity, and at the same time it is possible to reduce the frictional resistance between the communication wire and the pipeline by the rolling of the small size particles, much like the principle of bearings, to thereby produce an effect to increase smoothness.

As for the material to produce the above-mentioned effect, it is possible to select graphite, metal such as copper or aluminum, or the like, desirably, so long as the material is able to conduct and distribute high potential static electricity.

Further, according to the present invention, small size particles are inserted into a pipeline together with a communication wire and compressed air, and passed on with the air flow through the pipeline. At this time, if the small size particles are held between the communication wire and the pipeline on the way, the communication wire is lifted by a value equal to the particle size so that the small size particles reduce the frictional resistance between the communication wire and the pipeline by their rolling, much like the principle of bearings, thereby producing an effect to increase smoothness.

As such small size particles, those which are light in weight to be easy to roll, hard in quality to be easy to lift with a communication wire material are preferable. From such conditions, hard plastics, light in specific gravity, such as acrylic, styrene, polycarbonate, or the like, are useful for the small size particles. For example, as a material which is light to be easy to roll, preferable material is a spherical plastic particle, a hollow plastic particle such as an acrylic particle or the like, those of which has no edges, and has the specific gravity of about 1 or less. Further, as a material which is hard in quality to be easy to lift with a communication wire, it is preferable a spherical particle having a minute surface and no edges, such as polyacrylate, polymethacrylate, polystyrene, polycarbonate, polyoxymethyrene or the like, those of which is in an area where it is glass-shaped in normal temperature. Furthermore, the spherical particle is harder than the pipeline and the communication wire. Preferably, the spherical particle has a hardness of 80 or over in the Shore hardness, and the pipeline and the communication wire have a hardness of 70 or less in the Shore hardness.

The particle size of 50 to 300 µm is preferable. If the particle size is less than 50 µm, the influence of static electricity generated in the particles is so large that the particles are difficult to move in the air flow. Such small particles may decrease the internal diameter of the pipeline by adhering to the inner wall of the pipeline so that the frictional resistance appears to have increased. On the other hand, if the particle size is too large, the particles clog the space between the pipeline and the communication wire so that the communication wire is squeezed, the frictional resistance is increased and the performance of insertion is reduced. For these reasons, particles having the size of between about 50 to 300 µm are preferred in order to move in the pipeline at a sufficient rate with the air flow, and to reduce the resistance of the insertion by causing a roller effect in the space between the communication wire and the pipeline.

The present method may also be used to recover a communication wire from a pipeline as well as inserting the wire into an empty pipeline.

PREFERRED EMBODIMENTS OF THE INVENTION

The preferred embodiments of the present invention will be described along with the accompanying drawings.

Figure 1:
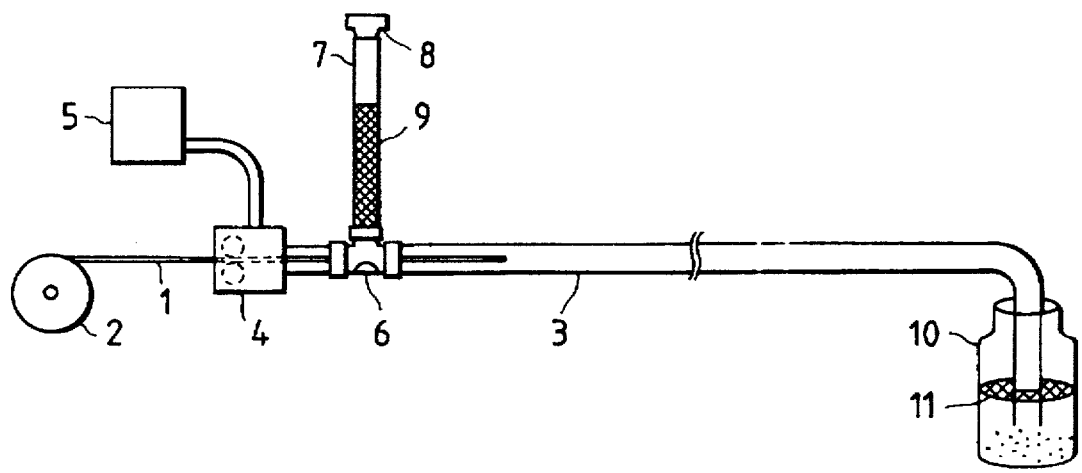
FIG. 1 is an explanatory diagram of an embodiment of both an apparatus and a method of the present invention for inserting or removing a communication wire through a pipeline by air flow.

FIG. 1 is an explanatory diagram of an embodiment of both an apparatus and a method of the present invention for inserting a communication wire material through a pipeline by air flow. In the drawing, the reference numeral 1 represents a communication wire; 2, a reel; 3, a pipeline; 4, a blowing head; 5, a compressor; 6, a T-branch; 7, a drop cylinder; 8, an air-tight stopper; 9, conductive material; 10, a recovery bottle; and 11, a filter. The communication wire 1 is fed from the reel 2, and inserted into the pipeline 3 through the blowing head 4. Compressed air is inserted from the compressor 5 to the pipeline 3 through the blowing head 4. The communication wire material 1 is introduced into the blowing head 4 through an air-tight seal, and inserted into the pipeline 3 by a driving reel. The T-branch 6 is provided on the way of the pipeline 3, and the drop cylinder 7 is attached thereto. A small hole is opened on the side of the T-branch 6 in the drop cylinder 7, and the conductive material 9 stored therein is supplied from the T-branch 6 into the pipeline 3 at a controlled rate, for example, in the range of 0.5 g/min to 20 g/min. The air-tight stopper 8 is provided on the top of the drop cylinder 7 so that the compressed air introduced into the pipeline 3 does not flow backward in the drop cylinder 7. The recovery bottle 10 is attached to the outlet side of the pipeline 3 so as to discharge the air flow blowing out of the outlet side of the pipeline 3 through the filter 11. Accordingly, the conductive material getting out of the end portion of the pipeline 3 together with the air flow is recovered into the recovery bottle 10. Generally, in the apparatus and method, the velocity of the air flow in the pipeline is from 1 to 10 m/min.

Figure 4:
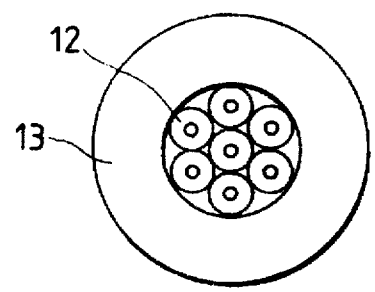
FIG. 4 is a sectional view of a communication wire used in examples of the present invention.

As the communication wire 1, as shown in FIG. 4, a wire material coated with a foamed polyethylene coating 13 and having an outer diameter of 2 mm was used. The communication wire 1 was comprised of seven optical communication wires 12 each having an outer diameter of 250 µm and arranged so that one of them was put at the center and the rest six were disposed around the center. A polyethylene pipe having an inner diameter of 6 mm and an outer diameter of 8 mm was used as the pipeline 3, and inserting was performed through the pipeline which was 1,500 m long.

The blowing head 4 has the same shape as that disclosed in Japanese Patent Examined No. Hei-2-22921, and has a driving roller for drawing the communication wire 1 into the pipeline 2 filled with compressed air, and a nozzle for introducing the compressed air supplied from the compressor into the pipeline. The drop cylinder 7 is provided for dropping the conductive material 9 into the pipeline 3. The T-branch 6 is disposed on the pipeline 3 side of the drop cylinder 7, and the air-tight stopper 8 is provided on the upper portion thereof. The pressure in the drop cylinder 7 is made almost the same as that in the pipeline 2 through the gap of the conductive material 9, so that the conductive material 9 can be dropped into the pipeline 3 by gravity. The quantity of dropping can be changed by the attachment angle of the drop cylinder 7.

The experimental results with a first embodiment will be described as follows.

Comparative Example 1-1

Inserting a communication wire without dropping a conductive material was performed by use of compressed air of pressure 6 kg/cm², and the insertion of the wire was easily performed at the rate of 10 m/min or more until the length of inserting was 700 m. However, the rate of insertion of the communication wire decreased at or after 700 m, until the rate was about 1 m/min at 850 m. In this state, the communication wire contacted with the pipeline tightly, and if a large quantity of communication wire was inserted from the inlet of the pipeline, it wound in the pipeline to lose the transfer characteristic of the communication wire. The wire in such a condition cannot be used in practice.

EXAMPLE 1-1

Figure 2:
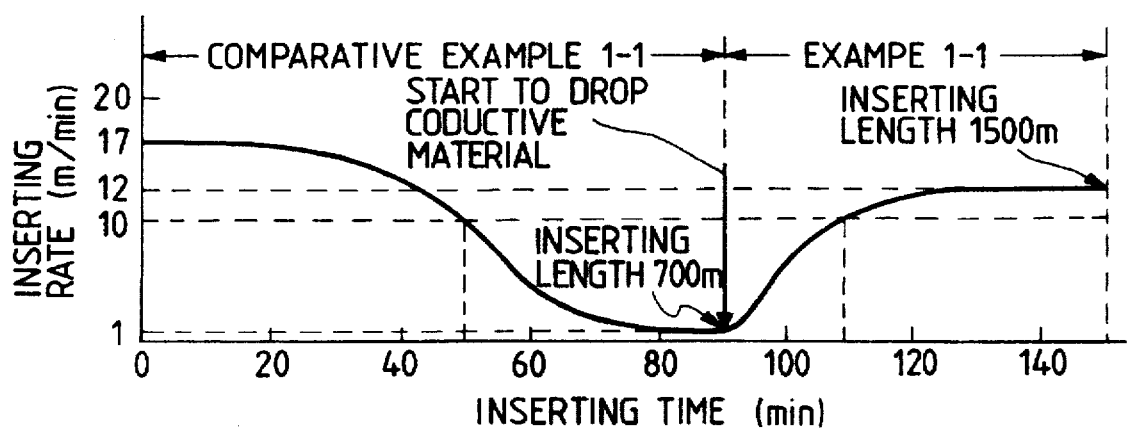
FIG. 2 is an explanatory diagram of the results of experiments with a first embodiment.

Graphite scale-like pieces each being 0.5 mm square and 0.05 mm thick were inserted from the T-branch into the pipeline at a rate of about 2 g/min from the time when the insertion rate was decreased in Comparative Example 1—1 (at approximately 90 min), so that the insertion rate of the wire increased gradually, and recovered to the insertion rate of 10 m/min in 20 minutes. The conductive material was inserted continuously as it was, and insertion through the entire pipeline 1,500 m in length could be performed. FIG. 2 shows the change of the rate of insertion for Comparative Example 1—1 and Example 1—1.

EXAMPLE 1-2

The conductive material in Example 1 was inserted from the time of starting insertion in the same manner, so that an insertion rate of not less than 10 m/min could be maintained throughout the pipeline, and insertion through the entire 1,500 m of pipeline could be completed in 97 minutes.

EXAMPLE 1-3

Small balls, each made of aluminum and having an outer diameter of 0.3 mm, were dropped as conductive material, and insertion was performed in the same manner as in Example 1 or 2, so that the wire insertion rate was always 10 m/min or greater, and insertion through the entire 1,500 m of pipeline could be performed in 102 minutes.

Comparative 1-2

After insertion of a communication wire was performed for 20 minutes while graphite scale-like pieces used in Example 1 were being dropped at a rate of 2 g/min into a pipeline for the first 5 minutes, insertion of the communication wire was continued with the dropping stopped. As a result, the insertion rate decreased to less than 10 m/min after the insertion distance of 750 m was reached. The reason for the decrease in the insertion rate was thought to be caused by the increase in static electricity generated between the communication wire and the inner wall of the pipeline after the dropping of the graphite scale-like pieces was stopped. The results from this Comparative Example adds support to the concept that static electricity should be eliminated or greatly reduced in the insertion process.

Comparative 1-3

Insertion of a communication wire was performed while talc particles (the size of each of which was about several µm to 30 µm) made from an insulating material were dropped into a pipeline. As a result, the rate decreased to less than 10 m/min at 600 m. At that time, electrostatic charging was detected on the outer surface of the pipeline.

The necessity of eliminating or greatly reducing static electricity could thus be confirmed from the results of Comparative Examples 1-2 and 1-3. The benefits from eliminating static electricity are also seen for a short pipeline. The presence of charging could be tested in a pipeline after inserting a communication wire in the case in which the method of the present invention was used or not used by cutting the pipeline and/or wire and sprinkling insulating powder such as talc was over the pipeline or the communication wire. The quantity of the conductive material adhering to the inner surface of the pipeline and the outer surface of the communication wire was small in the case of using the method of the present invention, giving no influence to the operation of the communication wire having been laid. By using this conductive material, it is possible to eliminate the phenomenon of tight contact between a communication wire and a pipeline caused by static electricity, so that it is possible to perform good insertion in the case of an insertion over a long distance.

If high bulk density particles such as metal particles are used as conductive material to be introduced into a pipeline, preferably, they are spherical shaped, spheroidal, or the like so that they do not injure or interfere with the communication wire or the pipeline, and they have a large enough specific gravity, for example, the preferable specific gravity is 2 g/cm³ or over, so that they are effective in a pipeline having a lot of descents.

On the other hand, scale-like material having a low bulk density and a high movability by air flow may act effectively in a pipeline having a lot of ascents. As the material having a low bulk density, it is preferably plate-like or porous material which is light in weight comparing with the surface area thereof. For example, it is preferable that the ratio of the weight and volume in a vessel of the material is 1.5 g/cm³ or less. Further, as a material having a high movability, a material, on the surface of which graphite, molybdenum disulfide or the like exists so that the friction coefficient thereof is 0.5 or less, is preferable. Of such scale-like material, graphite is light in weight and exhibits a high slidability at the same time that it is effective in the present invention.

The experimental results with a second embodiment will be described as follows. Insertion was performed in the same manner as that in the first embodiment.

Comparative Example 2-1

Inserting a communication wire without dropping small size particles was performed by use of compressed air of pressure 6 kg/cm², and the insertion was easily performed at the rate of 10 m/min or more until the inserted length of the wire was 700 m. However, the rate of insertion of the communication wire decreased after 700 m to a rate of about 1 m/min at 850 m. In this state, the communication wire contacted with the pipeline tightly, and if a large quantity of communication wire was inserted from the inlet of the pipeline, it wound in the pipeline to lose the transfer characteristic of the communication wire. The wire in such a condition cannot be used in practice and the insertion rate is not practical.

EXAMPLE 2-1

Figure 3:
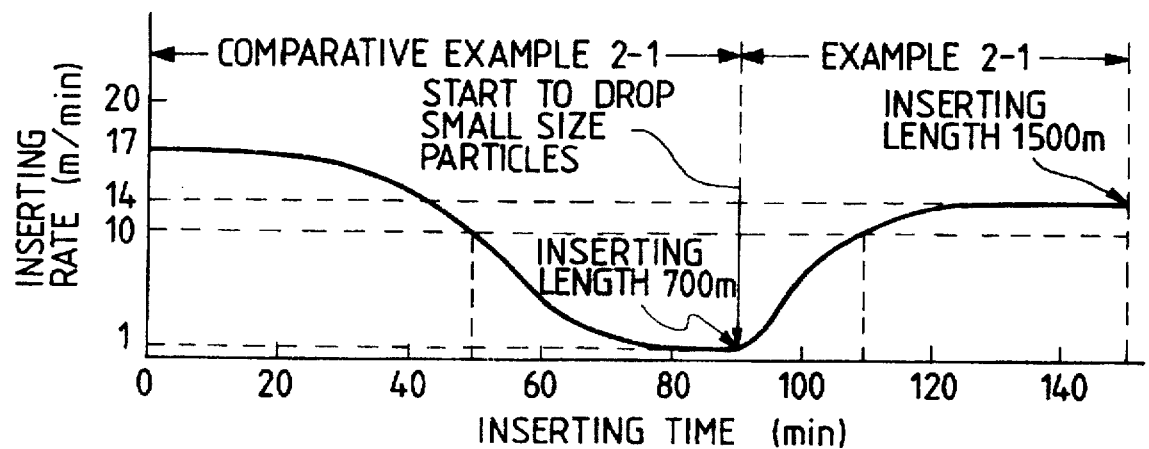
FIG. 3 is an explanatory diagram of the results of experiments with a second embodiment.

Substantially spherical small size acryl particles each having a diameter of about 100 µm were inserted from the T-branch into the pipeline at a rate of about 2 g/min from the time when the propelling rate of the communication wire was increased in Comparative Example 2-1 (at approximately 90 min), so that the insertion rate of the wire increased gradually, and recovered to the insertion rate of 10 m/min in 18 minutes. The rate was further increased and reached 14 m/min in 35 minutes. The small size acryl particles were sent continuously, and the wire was inserted throughout the entire 1,500 m of the pipeline. FIG. 3 shows the change of the rate of insertion for the communication wire for both Example 21- and Comparative Example 2-1.

EXAMPLE 2-2

The small size acryl particles in Example 1 were sent from the time of starting the propelling of the communication wire in the same manner, so that the insertion rate of the wire of 10 m/min could be maintained all over the pipeline, and insertion throughout the entire 1,500 m of pipeline could be completed in 87 minutes.

EXAMPLE 2-3

Hollow acryl particles of 100 µm, as the small size particles, were dropped, and insertion of the coated wire was performed in the same manner as that in Example 2-1 or 2-2, so that a wire insertion rate of not less than 10 m/min could be maintained over the entire length of the pipeline, and insertion of the wire throughout the 1,500 m could be performed in 90 minutes.

EXAMPLE 2-4

Substantially spherical iron particles having particle size of about 100 µm, as small size particles, were dropped, and insertion of the wire was performed in the same manner as in Examples 2-1 and 2-2, so that insertion throughout the entire 1,500 m of pipeline could be performed in 125 minutes without lowering the wire propelling rate to less than 10 m/min. However, the reason why the insertion rate was lower than that for the acrylic particles in Example 2-2 is thought to be due to the lesser roller bearing effect of the iron since the iron particles are too heavy to roll effectively as compared to the acrylic particles.

Comparative 2-2

Insertion was performed while substantially spherical acrylic particles having a diameter of about several µm to 30 µm were dropped into a pipeline, so that the wire propelling rate decreased to less than 10 m/min at 150 m. In this case, the reason why the insertion rate decreased is thought to be due to the adhesion of the acrylic particles to the inner surface of the pipeline to thereby increase friction.

Comparative 2-3

Insertion was performed while substantially spherical acrylic particles having a diameter of about 350 µm to 500 µm were dropped into a pipeline, so that the rate decreased to less than 10 m/min at 50 m, and insertion was stopped at 60 m.

In this case, the acrylic particles were seen to clog the space between the inner wall of the pipeline and the communication wire. Thus, the acrylic particles were too large to obtain good performance for the insertion or propelling of the communication wire.

EXAMPLE 2-5

Fluororesin particles having a particle size of about 100 m, as small size particles, were dropped, and insertion was performed in the same manner as in Examples 2-1 and 2-2, so that insertion over 1,500 m of pipeline could be performed in 130 minutes without lowering the wire propelling rate to less than 13 m/min. In the case of this example, the reason why the rate of propelling was lower than that in the case of using acrylic particles in Example 2-2 is because the fluororesin particles were soft enough to be deformed between the communication wire and the pipeline so that the communication wire was difficult to lift and the particles were difficult to roll, thereby lowering the bearing effect.

EXAMPLE 2-6

Acrylic particles shaped as a cube of approximately 100 µm, as small size particles, were dropped, and insertion was performed in the same manner as in Examples 2-1 and 2-2. Inserting could be performed throughout the entire 1,500 m of pipeline in 120 minutes without lowering the wire propelling rate to less than 10 m/min. The reason why the insertion rate was lower was because the particles were cubical in shape and were thus difficult to roll effectively.

EXAMPLE 2-7

The communication wire inserted throughout the entire 1,500 m of pipeline in Example 2-2 was tested for recovery by use of compressed air having a pressure of 6 kg/cm², but the communication wire could not move or be removed from the pipeline. When the acrylic particles in Example 2-2 were inserted from the opposite end of the pipeline (near the recovery bottle and filter of FIG. 1), the whole length of the communication wire could be pulled out of or removed from the pipeline in 100 minutes.

As is apparent from the above description, according to the present invention, it is possible to perform insertion of a communication wire through a long pipeline stably, and the present invention can also be used to remove or recover a communication wire from a pipeline.

What is claimed is:

1. An apparatus for inserting a communication wire through a pipeline from a proximal end of the pipeline to a distal end of the pipeline by airflow, said apparatus comprising:

a communication wire supplying apparatus constructed and arranged to supply the communication wire to be inserted through the pipeline;

a blowing head disposed adjacent the proximal end of the pipeline for drawing the communication wire supplied by said communication wire supplying apparatus into the proximal end of the pipeline;

a compressed air source in fluid communication with said blowing head for providing a supply of compressed air to be directed by said blowing head into said pipeline to propel the wire drawn into the proximal end from the proximal end to the distal end; and a drop cylinder for containing friction reducing particles, said drop cylinder connected to and disposed above the pipeline at a position downstream with respect to said blowing head and opened at one end thereof to the pipeline to enable said drop cylinder to feed by force of gravity a supply of friction reducing particles into the pipeline continuously during communication wire installation to be blown by the compressed air and carried through the pipeline at much higher speed than the communication wire to reduce frictional forces between an outer surface of the communication wire and an inner surface of the pipeline.

2. The apparatus of claim 1, further comprising a recovery device disposed proximate the distal end of the pipeline and constructed and arranged to recover the compressed air passing through said pipeline.

3. The apparatus of claim 1 wherein said friction reducing particles are electrically conductive.

4. The apparatus of claim 2 further comprising a separating device associated with said recovery device, said separating device constructed and arranged to separate said entrained friction reducing particles from the compressed air recovered by said recovery device.

5. The apparatus of claim 1 wherein said drop cylinder is connected to the pipeline by a T-branch connector.

6. The apparatus of claim 2 wherein said recovery device comprises a recovery bottle disposed in a position to capture compressed air exiting from the distal end of the pipeline.

7. The apparatus of claim 4 wherein said separating device comprises a filter.

8. The apparatus of claim 1 wherein said communication wire supplying apparatus comprises a reel disposed in front of the proximal end of the pipeline for holding a rolled supply of the communication wire and for dispensing the communication wire to be inserted through the pipeline.

* * * * *